United States Patent [19]

Mortier et al.

[11] Patent Number: 4,690,596
[45] Date of Patent: Sep. 1, 1987

[54] DEVICE FOR MAKING INSIDE GROOVES IN HOLLOW PARTS

[75] Inventors: Guy Mortier, Bonnetable; Jean-Claude Chartrain, St-Aubin des Coudrais, both of France

[73] Assignee: Souriau & Cie., Boulogne, France

[21] Appl. No.: 873,382

[22] Filed: Jun. 12, 1986

[30] Foreign Application Priority Data

Jun. 18, 1985 [FR] France .................................. 85 09203

[51] Int. Cl.⁴ .............................................. B23C 5/26
[52] U.S. Cl. .................................... 409/143; 409/144; 409/230
[58] Field of Search ............... 409/143, 144, 206, 215, 409/230, 231, 232, 233, 234, 235; 144/136 R

[56] References Cited

U.S. PATENT DOCUMENTS

| 548,822 | 10/1895 | Stirling | 409/143 |
| 1,239,159 | 9/1917 | Coats | 409/143 |
| 1,330,971 | 2/1920 | Arthur | 409/144 |
| 1,540,699 | 6/1925 | McMullen . | |
| 1,735,841 | 11/1929 | Von Neudeck | 409/143 |

Primary Examiner—Z. R. Bilinsky
Attorney, Agent, or Firm—McAulay, Fields, Fisher, Goldstein & Nissen

[57] ABSTRACT

An elongate body (1) comprises an assembly of two body portions (2, 3) and contains a plurality of intermeshing gearwheels (12A to 12D) with the first gearwheel (12A) having teeth projecting through an end opening (10) to be driven by an external toothed wheel, and with the last gearwheel (12D) being disposed to drive a milling bit (15) which projects through a side opening (11).

7 Claims, 4 Drawing Figures

DEVICE FOR MAKING INSIDE GROOVES IN HOLLOW PARTS

The invention relates to a device for making inside grooves in hollow parts.

BACKGROUND OF THE INVENTION

Numerous parts are assembled in pairs by means of a groove inside one of the parts serving to guide movement of the parts relative to each other, or serving to define the position of the parts relative to each other, or serving to lock one part inside the other.

Common examples of pairs of parts including one part with an inside groove for assembly with another part are connectors for interconnecting wires or optical fibers. A first connector part is inserted into a second connector part at a determined position relative thereto by axial translation and rotation as guided by an inside groove on the second part. Since such a groove is generally helical in shape, it is conventional to make the groove using a conventional tapping tool. However, such a groove can only follow a continuous path of constant slope running from one of the end faces of the part in which it is made. In other words, such a groove must open out outside the part in which it is made and it cannot change its slope; in particular it cannot be terminated by a non-sloping portion or by a portion of reversed slope, which would be convenient for locking some two-part assemblies together.

U.S. Pat. No. 1,540,699 describes a device for making inside grooves and comprising a two-part elongate body having an interior hollow receiving a succession of intermeshing gearwheels one after the other; the body is provided over its entire length with fixing means for holding the two parts together.

The main aim of the invention is to provide a device of small body size and suitable for making any desired inside groove in small parts such as electric connectors, one of the ends of said grooves optionally opening out from the part, or else the grooves are blind at both ends, and the slope of said grooves may be constant, or variable, or nil, or reversed over portions of their length.

Another aim of the invention is to provide a device suitable for moving along a milling axis so as to readily adjust the depth of the grooves to be made.

SUMMARY OF THE INVENTION

The present invention provides a device for making inside grooves in a hollow part, said device comprising an elongate body built up from at least two assembled body portions and having a first end and a second end, said body having an interior hollow extending from a side opening close to said second end, and said interior hollow containing a succession of intermeshing gearwheels including a last gearwheel having fixing means facing said side opening and suitable for fixing to a milling bit, the device including the improvement whereby said first end of said body is provided with mounting means including a free end face, and said interior hollow has an end opening which opens out in said free end face allowing a portion of the teeth of a first one of said gearwheels to project through said end opening, said first end mounting means comprising a cross bar having two opposite side faces for mounting in a slideway running parallel to the teeth of said first gearwheel and the axis of a bit fixed to said last gearwheel.

In one embodiment of the invention, each gearwheel other than the last gearwheel is provided with a shaft on both of its opposite side faces, with said shafts being directly received in corresponding blind holes provided in the body portions.

BRIEF DESCRIPTION OF THE DRAWINGS

An embodiment of the invention is described by way of example with reference to the accompanying drawings, in which.

MORE DETAILED DESCRIPTION

Figure 1:
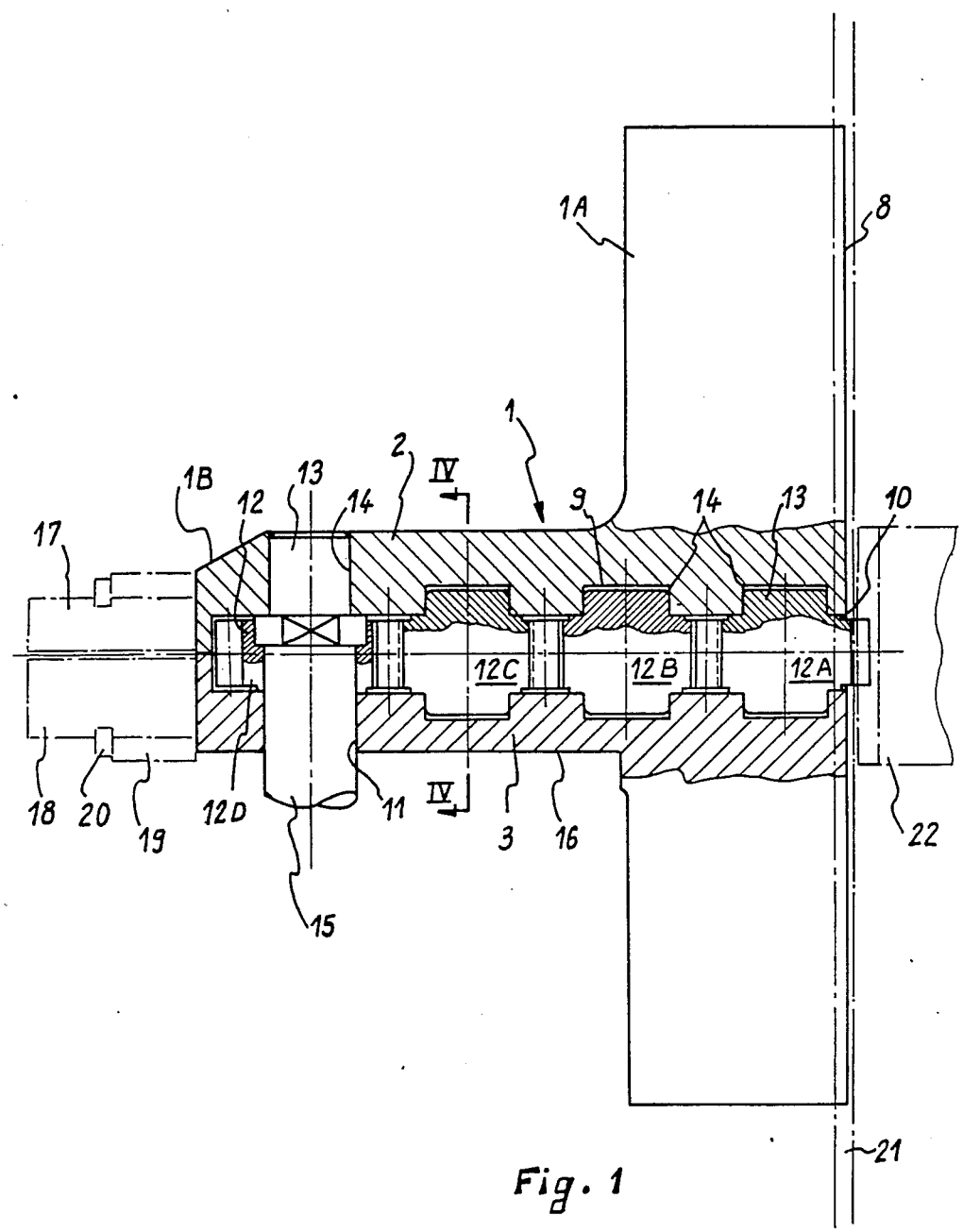
FIG. 1 is an overall view of an assembled device in accordance with the invention shown in section on a longitudinal plane perpendicular to its joint plane.
Figure 2:
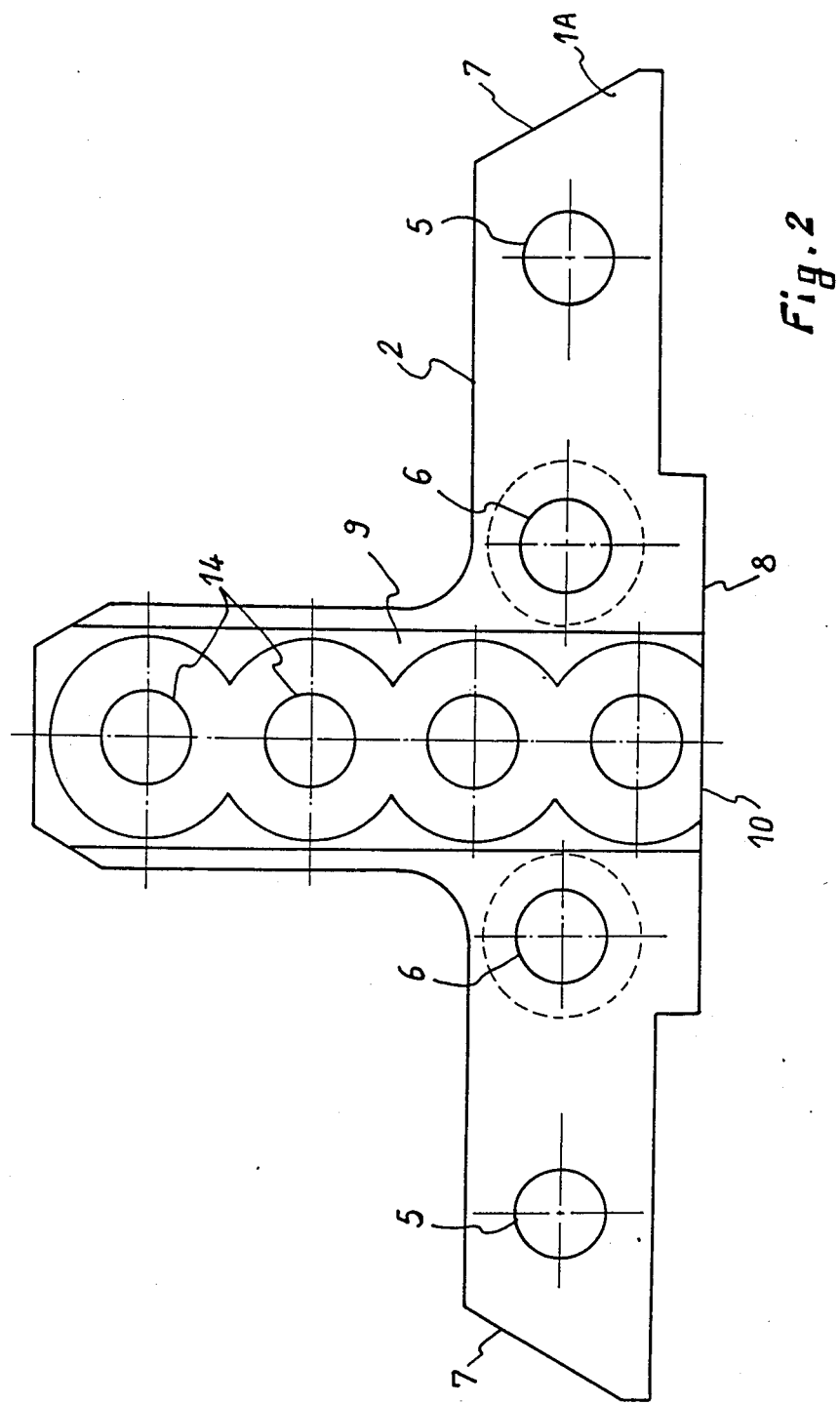
FIG. 2 shows a portion of the elongate body seen in its joint plane with the other portion.
Figure 3:
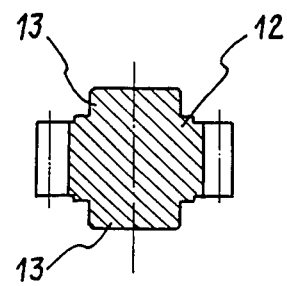
FIG. 3 is a view of a gearwheel of the FIG. 1 device shown in section in a plane containing its axis.

A device in accordance with the invention has an elongate body 1 comprising a first portion 2 assembled with a second portion 3. They are releasably assembled from opposite sides of a joint plane (FIG. 4) by means of centering pegs inserted into corresponding blind holes 5, and by means of bolts engaged in through holes 6. After its two portions 2 and 3 have been assembled, a first end 1A of the body 1 has mounting means such as a cross bar with end faces 7 sloping towards each other. The mounting means is terminated by a free end face 8.

The assembled portions 2 and 3 extend from the mounting means at the first end 1A to a second end 1B which is located at a distance from the first end 1A, which distance is fixed as a function of the intended use of the device, as is made clear below. The two portions 2 and 3 also define an inside hollow 9 which runs between the second end 1B and an end opening 10 provided in the free end face 8 at the first end 1A. Near to the second end 1B, the inside hollow 9 is in communication with a side opening 11 which opens out in the side face of the second portion 3.

The shape of the inside hollow 9 is suitable for receiving a plurality of straight-tooth gearwheels 12 which mesh together in succession. A first gearwheel 12A is disposed so that some of its teeth project through the end opening 10. The first gearwheel 12A and the following gearwheels 12B and 12C, but not the last gearwheel 12D, have respective pairs of stub shafts 13 projecting from their side faces. These stub shafts 13 are fitted in corresponding blind holes 14 provided in both of the portions 2 and 3. The last gearwheel 12D has a single shaft 13 for fitting in a hole 14 provided in the first portion 2 and disposed coaxially with the side opening 11 in the second portion 3.

The number and the diameter of the gearwheels 12 and the position of the side opening 11 are selected so that the last gearwheel 12D is placed opposite the side opening 11. The last gearwheel 12D is designed to enable a milling bit 15 to be mounted thereon with its cutting end projecting out through said side opening 11. The bit 15 may be fixed to the last gearwheel 12D in various different ways, for example the stock end of the bit may be threaded for screwing into a central hole in the gearwheel 12D. Regardless of the fixing system used, the stock end of the bit may be a good fit in the opening 11 to provide a second shaft for the last gearwheel 12D.

Other bit fixing methods may be used, and the invention is not limited to any particular method. In a variant embodiment, the last gearwheel 12D could include a member projecting permanently through the side opening 11, with the said member being provided with bit-receiving means.

Figure 4:
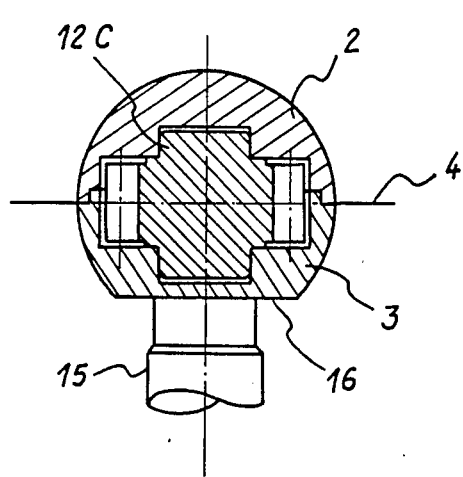
FIG. 4 is a section view on line IV—IV of FIG. 1.

FIG. 4 shows how the elongate body 1 is generally cylindrical beyond the mounting cross bar, and that the second portion 3 has a plane longitudinal outside face 16 through which the side opening 11 opens out. The plane face 16 leaves clearance for the cutting end of the bit 15.

The elongate body 1 may be of any length, depending on the furthest distance at which it is desired to mill an inside groove in a hollow part from an opening large enough to allow the body 1 to be inserted together with a bit 15 fitted thereto. The number of gearwheels 12 is deduced from the body length. If the elongate body 1 is very long, each of its portions 2 and 3 may project beyond the second end 1B in the form of respective semi-cylindrical extensions 17 and 18 of smaller cross section. Once the two extensions 17 and 18 have been brought together, they are locked together by a binding ring 19. The binding ring 19 is prevented from moving axially by a resilient stop ring 20, as shown in dot-dashed lines in FIG. 1. The two portions 2 and 3 are thus firmly held together, by the binding ring 19 at one end (1B) and by the bolts passing through the holes 6 at the other end (1A).

The above-described device operates as follows:

The sloping end faces 7 of the cross bar at the first end 1A are received and guided in a dovetailed slideway 21 shown in dot-dashed lines in FIG. 1. The bottom of the slideway 21 includes a toothed wheel 22 disposed to mesh with the first gearwheel 12A. Advantageously, the toothed wheel 22 is several times thicker than the first gearwheel 12A and the device is fixed to control means (not shown) capable of sliding it along the slideway. The sliding direction extends parallel to the teeth of the toothed wheel 22 and to the axis of the milling bit 15, and consequently it is possible to move the device along the slideway by virtue of the teeth of the first gearwheel 12A sliding along the toothed wheel 22, thereby easily adjusting the depth of the groove milled by the bit 15. It is clear that the bit can be used to mill grooves which are blind at one end or both ends, and which are at any desired development and slope.

For example, in order to join two complementary connector elements, it may be desirable to provide an inside groove on one of the elements such that the groove has a first length for positioning the two elements, a second axially extending length for guidance while pins are being pushed into corresponding receptacles, a third length for compressing the join, and finally a fourth length for locking together the two interconnected connector elements. These lengths slope at different angles and are easily made using a device in accordance with the invention.

In a specific example, the elongate body 1 has a diameter of 9 mm (excluding the plane face 16), and the mill cutter 15 rotates at 7,000 rpm.

What is claimed is:

1. A device for making inside grooves in a hollow part, said device comprising:
   an elongate body having a first end and a second end;
   said body having an interior hollow extending from said first end to a side opening close to said second end;
   said interior hollow containing a succession of intermeshing gearwheels including a first gearwheel mounted at said first end for engagement with a driving toothed wheel having a thickness larger than said first gearwheel, and a last gearwheel having fixing means facing said side opening and suitable for fixing a milling bit, said first end of said body being provided with mounting means for slidingly mounting said body on a slideway; and
   said mounting means and said slideway extending parallel to teeth of said driving wheel and said first gearwheel whereby said device can be moved in said slideway without discharging said first gearwheel from said driving wheel.

2. A device according to claim 1, wherein said driving wheel has a thickness several times larger than said first gearwheel.

3. A device according to claim 1, wherein each of said gearwheels other than the last gearwheel is provided with a shaft on both of its opposite side faces, with said shafts being directly received in corresponding blind holes provided in the body portions.

4. A device according to claim 1, wherein said body portions are held together by screws passing through respective holes provided at said first end.

5. A device according to claim 1, wherein each of said body portions is provided, at its second end, with a respective longitudinally extending projection, and wherein said projections are held together by a binding ring.

6. A device according to claim 1, wherein said last gearwheel is provided with a shaft on that one of its side faces which faces away from said side opening, and wherein said fixing means is of the female type to enable the stock of a bit received therein to act as a second shaft for said last gearwheel.

7. A device according to claim 1, wherein beyond said first or mounting end, said elongate body is generally cylindrical in shape with a longitudinally extending plane face through which said side opening opens out.

* * * * *